United States Patent
Hashimoto et al.

(10) Patent No.: US 9,371,047 B2
(45) Date of Patent: Jun. 21, 2016

(54) BUMPER STRUCTURE AND METHOD FOR MANUFACTURING BUMPER BEAM

(71) Applicant: Kobe Steel, Ltd., Kobe-shi (JP)

(72) Inventors: Narikazu Hashimoto, Shimonoseki (JP); Tsunetake Tsuyoshi, Shimonoseki (JP); Takahiro Shikama, Shimonoseki (JP); Hiroyuki Kajiwara, Shimonoseki (JP)

(73) Assignee: Kobe Steel, Ltd., Kobe-shi (JP)

( * ) Notice: Subject to any disclaimer, the term of this patent is extended or adjusted under 35 U.S.C. 154(b) by 44 days.

(21) Appl. No.: 14/453,091

(22) Filed: Aug. 6, 2014

(65) Prior Publication Data
US 2015/0069770 A1 Mar. 12, 2015

(30) Foreign Application Priority Data
Sep. 9, 2013 (JP) .................. 2013-186720

(51) Int. Cl.
*B60R 19/00* (2006.01)
*B60R 19/18* (2006.01)
*C22F 1/053* (2006.01)
*C22C 21/10* (2006.01)

(52) U.S. Cl.
CPC ................. *B60R 19/18* (2013.01); *C22C 21/10* (2013.01); *C22F 1/053* (2013.01); *B60R 2019/182* (2013.01)

(58) Field of Classification Search
CPC .......... B60R 19/18; C22F 1/053; C22C 21/10
USPC ......................... 293/102, 120, 122
See application file for complete search history.

(56) References Cited

U.S. PATENT DOCUMENTS

| | | | | |
|---|---|---|---|---|
| 5,407,239 A | * | 4/1995 | Arai .................. | B60R 19/18 293/102 |
| 2001/0024051 A1 | * | 9/2001 | Kariatsumari .......... | B60R 19/18 296/155 |
| 2008/0054656 A1 | | 3/2008 | Guiles et al. | |
| 2010/0021842 A1 | | 1/2010 | Kanga | |
| 2011/0049915 A1 | * | 3/2011 | Kokubo ................. | B21D 53/88 293/132 |
| 2012/0043701 A1 | | 2/2012 | Kanga | |

(Continued)

FOREIGN PATENT DOCUMENTS

| | | |
|---|---|---|
| JP | 7-25296 | 1/1995 |
| JP | 7-305151 | 11/1995 |
| JP | 10-168553 | 6/1998 |

(Continued)

*Primary Examiner* — Joseph D Pape
(74) *Attorney, Agent, or Firm* — Oblon, McClelland, Maier & Neustadt, L.L.P.

(57) ABSTRACT

There is provided a bumper beam that is formed of a 7000 series aluminum alloy hollow extrusion, has a crushed longitudinal portion, and locally has a low-hardness region in a bumper stay joint section. A portion (portion to be heated) of end portions of the bumper beam formed of a tempered member of a heat-treatable aluminum alloy extrusion is subjected to reversion treatment, thereby forming a heat-affected zone in a bumper stay joint section. An end region (portion to be crushed) of the heated portion is subjected to cold crushing, and then the whole bumper beam is subjected to age hardening. The heated portion and a non-heat-affected zone are hardened through the age hardening, thereby forming a low-hardness region that overlaps the joint section in a portion of the heat-affected zone.

12 Claims, 6 Drawing Sheets

(56) References Cited

U.S. PATENT DOCUMENTS

| | | |
|---|---|---|
| 2013/0285291 A1 | 10/2013 | Kanga |
| 2014/0152029 A1* | 6/2014 | Taniguchi ............... B60R 19/18 293/102 |

FOREIGN PATENT DOCUMENTS

| | | |
|---|---|---|
| JP | 2000-335333 A | 12/2000 |
| JP | 2003-118367 | 4/2003 |
| JP | 3465862 | 11/2003 |
| JP | 2007-119853 | 5/2007 |
| JP | 2007-290582 A | 11/2007 |
| JP | 4111651 | 7/2008 |
| JP | 2010-502496 | 1/2010 |
| JP | 2010-083381 A | 4/2010 |
| JP | 2013-023753 A | 2/2013 |

* cited by examiner

BUMPER STRUCTURE AND METHOD FOR MANUFACTURING BUMPER BEAM

BACKGROUND OF THE INVENTION

1. Field of the Invention

The present invention relates to a bumper beam formed of a heat-treatable aluminum alloy extrusion, a bumper structure including the bumper beam and a pair of bumper stays joined to both end portions of the bumper beam, and a method for manufacturing the bumper beam.

2. Description of the Related Art

Japanese Patent Nos. 3465862 and 4111651 and Japanese Unexamined Patent Application Publication Nos. 7-25296 and 2003-118367 disclose the manufacture of automotive reinforcing members, such as door beams and bumper beams, that includes crushing an end region of an aluminum alloy extrusion, which is composed of a pair of opposing flanges and a plurality of webs coupled to the flanges, in a direction perpendicular to a surface of the flanges. Japanese Patent No. 4111651 discloses crushing of a press-quenched 6000 series (Al—Mg—Si) aluminum alloy extrusion after age hardening. Japanese Unexamined Patent Application Publication No. 2003-118367 discloses crushing of a press-quenched 6000 or 7000 series (Al—Zn—Mg) aluminum alloy extrusion during T1 tempering after extrusion, and age hardening of the extrusion after the crushing.

Even 7000 series aluminum alloy extrusions after press quenching and before age hardening (T1-tempered members) are hardened through natural aging and suffer a decrease in formability. As described in Japanese Unexamined Patent Application Publication Nos. 7-305151, 10-168553, and 2007-119853, in order to improve formability, 7000 series aluminum alloys hardened through natural aging are subjected to reversion treatment to decrease the strength thereof.

Japanese Unexamined Patent Application Publication (Translation of PCT Application) No. 2010-502496 discloses annealing a longitudinal portion (a central portion, an end portion, or a joint for a bumper stay) of a cylindrical bumper beam manufactured by roll forming of a high-strength steel sheet to soften only the longitudinal portion and thereby improving the collision energy absorption characteristics.

SUMMARY OF THE INVENTION

The formation of a locally softened portion in a longitudinal portion (in particular, a joint for a bumper stay) of a bumper beam formed of a 6000 or 7000 series heat-treatable aluminum alloy extrusion subjected to plastic working, such as crushing, as described in Japanese Unexamined Patent Application Publication (Translation of PCT Application) No. 2010-502496, requires three heat treatments of reversion treatment, age hardening, and annealing, which are responsible for low productivity and increased costs.

Accordingly, it is an object of the present invention to efficiently provide a bumper beam at low cost that is formed of a heat-treatable aluminum alloy extrusion, has a longitudinal portion subjected to plastic working, such as crushing, and has a locally softened portion.

A bumper structure according to the present invention includes a bumper beam and a pair of bumper stays joined to both end portions of the bumper beam. The bumper beam is formed of a heat-treatable aluminum alloy extrusion and has a longitudinal portion subjected to plastic working. The whole bumper beam is subjected to age hardening after the plastic working. The portion of the bumper beam subjected to plastic working is subjected to reversion treatment before the plastic working, thereby forming a heat-affected zone in bumper stay joint sections and forming a low-hardness region that overlaps the joint sections in the bumper beam. The term "heat-affected zone", as used herein, refers to a portion that was heated through heat conduction from a portion heated for reversion treatment and possibly has received a structural modification. The term "low-hardness region", as used herein, refers to a region that is formed in the heat-affected zone and has lower Vickers hardness after age hardening than the Vickers hardness of a portion heated for reversion treatment and the Vickers hardness of a non-heat-affected zone (a portion other than the portion heated for reversion treatment and the heat-affected zone).

In the case where the bumper beam in the bumper structure includes a central portion parallel to an automobile width direction, end portions that are tilted toward an automobile body, and bent portions coupled to the central portion and the end portions, the joint sections and the low-hardness regions are disposed in the end portions.

In the bumper structure, preferably, a minimum hardness position in the low-hardness region is disposed in the joint sections.

Preferably, the heat-treatable aluminum alloy extrusion is formed of a JIS 7000 series aluminum alloy. In this case, the difference between the minimum Vickers hardness of the low-hardness region and the Vickers hardness of a portion hardened through age hardening (the non-heat-affected zone) in the reversion treatment is 20 Hv or more.

The bumper beam of the bumper structure can be manufactured by forming the bumper beam using a T1-tempered member of a heat-treatable aluminum alloy extrusion, subjecting a longitudinal portion of the bumper beam to reversion treatment, thereby forming a heat-affected zone in a bumper stay joint section, performing cold plastic working on a region subjected to the reversion treatment, and subjecting the whole bumper beam to age hardening, thereby forming a low-hardness region that overlaps the joint section in the bumper beam. The term "T1-tempered member", as used herein, refers to a member that is not subjected to artificial age hardening but is subjected to natural aging after press quenching.

The present invention can efficiently provide an inexpensive bumper beam that is formed of a heat-treatable aluminum alloy extrusion, has a longitudinal portion subjected to plastic working, such as crushing, and locally has a low-hardness region (softened portion) in a bumper stay joint section, and an inexpensive bumper structure including the bumper beam. The bumper structure has better collision energy absorption characteristics than bumper structures not having the low-hardness region.

DESCRIPTION OF THE PREFERRED EMBODIMENTS

A bumper structure and a method for manufacturing a bumper beam according to the present invention will be more specifically described with reference to FIGS. 1 to 7.

Figure 1A:
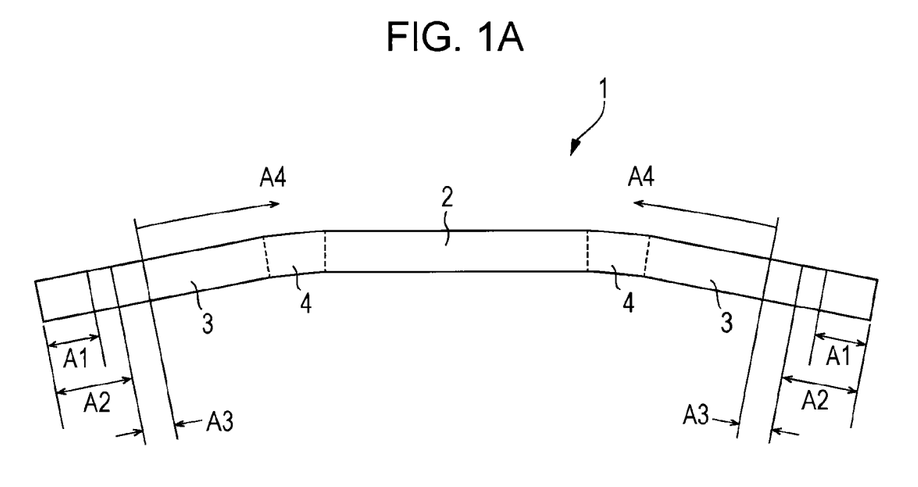
FIG. 1A is a plan view of a portion heated for reversion treatment and a heat-affected zone in crushing of an end portion of a bumper beam.
Figure 1B:
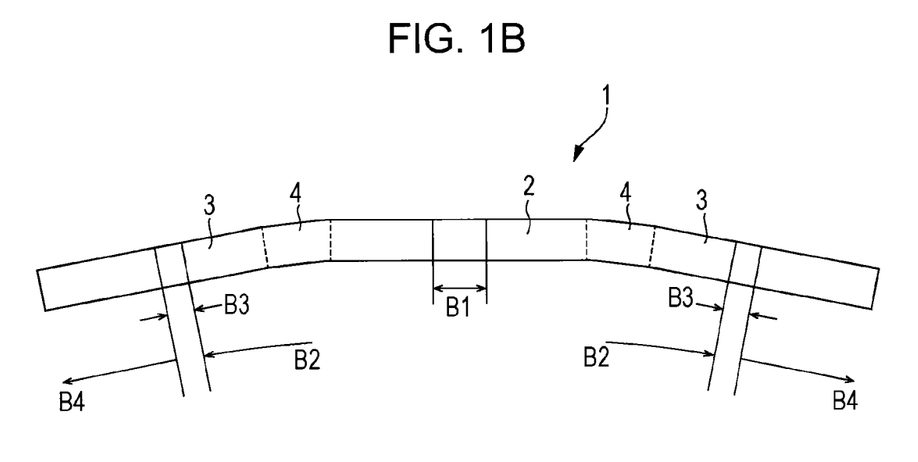
FIG. 1B is a plan view of a portion heated for reversion treatment and a heat-affected zone in crushing of a central portion.

A bumper beam 1 (a semifinished product before crushing) illustrated in FIG. 1 is formed by bending a heat-treatable aluminum alloy hollow extrusion having a rectangular cross section and is composed of a central portion 2, which is to be attached parallel to an automobile in the automobile width direction, left and right end portions 3 that are tilted toward the automobile body, and bend portions 4 coupled to the central portion 2 and the end portions 3. The boundaries between the central portion 2 and the bent portions 4 and the boundaries between the end portions 3 and the bent portions 4 are indicated by broken lines. The bumper beam 1 is formed of a T1-tempered member. The whole bumper reinforcing member 1 is slightly hardened through natural aging. The bending may be performed between reversion treatment and crushing described below.

When the end portions 3 of the bumper beam 1 are crushed, regions (portions A2 to be heated) including portions A1 to be crushed in both end portions of the bumper beam 1 illustrated in FIG. 1A are heated for reversion treatment, and then the portions A1 are crushed.

The reversion treatment forms heat-affected zones A3 that are adjacent to the heated portions A2 and are heated through heat conduction from the heated portions A2. Non-heat-affected zones A4 are disposed on the central portion 2 side of the heat-affected zones A3. The heating for reversion treatment must be performed such that the portions A1 to be crushed are subjected to reversion treatment, and the heat-affected zones A3 are formed in joint sections S of bumper stays 5 (see FIG. 2).

When the central portion 2 of the bumper beam 1 is crushed, a region (a portion B2 to be heated) including a portion B1 to be crushed in the central portion 2 of the bumper beam 1 illustrated in FIG. 1B is heated for reversion treatment, and then the portion B1 is crushed.

The reversion treatment forms heat-affected zones B3 that are adjacent to the heated portion B2 and are heated through heat conduction from the heated portion B2. Non-heat-affected zones B4 are disposed outside the heat-affected zones B3. Also in this case, the heating for reversion treatment must be performed such that the portion B1 to be crushed is subjected to reversion treatment, and the heat-affected zones B3 are formed in joint sections S of the bumper stays 5 (see FIG. 3).

In the case of reversion treatment of a 7000 series aluminum alloy in the present invention, the heated portions A2 and B2 were held at a temperature in the range of 330° C. to 550° C. for a predetermined time and were then cooled (air cooling or water cooling). This holding temperature range includes a much higher temperature range than the holding temperature range of common reversion treatment (see Japanese Unexamined Patent Application Publication Nos. 7-305151, 10-168553, and 2007-119853). The holding temperature of the reversion treatment preferably ranges from 350° C. to 550° C., more preferably 400° C. to 550° C. The holding time may be more than zero seconds. The heated portions A2 and B2 may be cooled immediately after reaching the holding temperature. Although the upper limit of the holding time is not particularly limited, the holding time is preferably as short as five minutes or less in terms of production efficiency. Reversion treatment on other alloys (for example, 6000 series) may be performed under the same conditions. A high-frequency induction heater or a salt bath may be used as a heating means.

Figure 2:
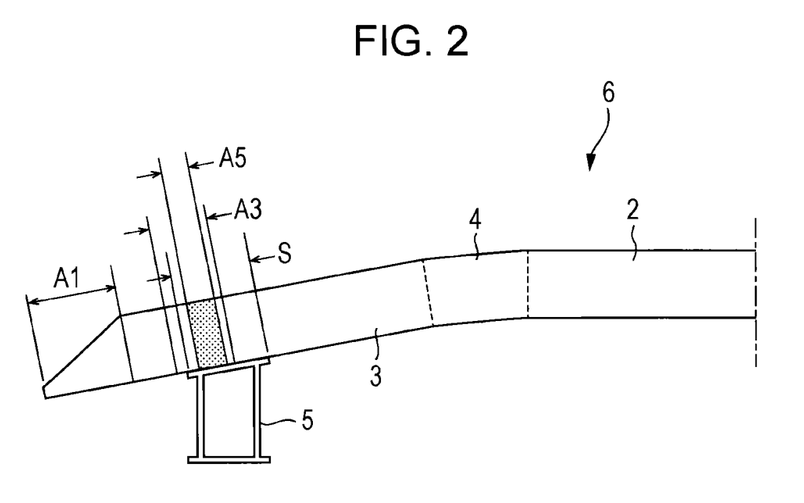
FIG. 2 is a plan view of a heat-affected zone and a low-hardness region of a bumper structure that includes the bumper beam illustrated in FIG. 1A having a crushed end portion and a bumper stay joined to the bumper beam.
Figure 3:
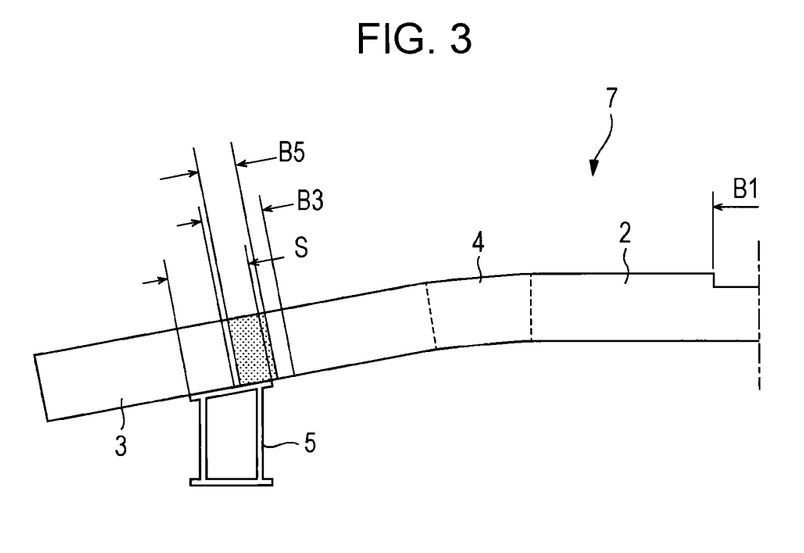
FIG. 3 is a plan view of a heat-affected zone and a low-hardness region of a bumper structure that includes the bumper beam illustrated in FIG. 1B having a crushed central portion and a bumper stay joined to the bumper beam.

The reversion treatment softens the heated portions A2 and B2, and low-hardness regions A5 and B5 are formed in the heat-affected zones A3 and B3 after age hardening (see FIGS. 2 and 3). Crushing after reversion treatment is preferably performed within 72 hours after the reversion treatment (after cooling).

7000 series aluminum alloys generally contain Zn: 3.0 to 8.0 mass %, Mg: 0.4 to 2.5 mass %, Cu: 0.05 to 2.0 mass %, and Ti: 0.005 to 0.2 mass % and optionally contains one or two or more of Mn: 0.01 to 0.3 mass %, Cr: 0.01 to 0.3 mass %, and Zr: 0.01 to 0.3 mass %, the remainder being Al and incidental impurities.

These compositions will be described below. The compositions of 7000 series aluminum alloys are known.

Zn and Mg are elements that can form an intermetallic compound $MgZn_2$ and thereby improve the strength of 7000 series aluminum alloys. A Zn content of less than 3.0 mass % or a Mg content of less than 0.4 mass % results in a practically insufficient proof stress of less than 200 MPa. Even when the extrusion is subjected to reversion treatment before plastic working, a Zn content of more than 8.0 mass % or a Mg content of more than 2.5 mass % results in cracking caused by plastic working, high residual tensile stress due to plastic working, and significantly low stress corrosion cracking resistance. Thus, the Zn content ranges from 3.0 to 8.0 mass %, and the Mg content ranges from 0.4 to 2.5 mass %. The Zn content and the Mg content are preferably as high as possible in terms of reinforcement and weight reduction, for example, 5.0 to 8.0 mass % and 1.0 to 2.5 mass %, respectively, and 6.0 to 10.5 mass % in total.

Cu is an element that can improve the strength of 7000 series aluminum alloys. A Cu content of less than 0.05 mass % results in an insufficient strength improving effect. A Cu content of more than 2.0 mass % results in low extrusion processability. Thus, the Cu content ranges from 0.05 to 2.0 mass %, preferably 0.5 to 1.5 mass %.

Ti can reduce the size of crystal grains in the casting of 7000 series aluminum alloys and thereby improve the formability of the extrusion. This requires a Ti content of 0.005 mass % or more. At a Ti content of more than 0.2 mass %, this effect is saturated, and a coarse intermetallic compound is crystallized and impairs formability. Thus, the Ti content ranges from 0.005 to 0.2 mass %.

Mn, Cr, and Zr can suppress recrystallization of 7000 series aluminum alloy extrusions, form a fine recrystallized or fibrous crystal structure, and improve stress corrosion cracking resistance. This requires one or two or more of Mn: 0.01 to 0.3 mass %, Cr: 0.01 to 0.3 mass %, and Zr: 0.01 to 0.3 mass %.

7000 series aluminum alloys contain Fe and Si as main incidental impurities. In order to maintain the characteristics of 7000 series aluminum alloys, the Fe content is limited to 0.35 mass % or less, and the Si content is limited to 0.3 mass % or less.

After the portions A1 and B1 are crushed, the whole bumper beam 1 is subjected to age hardening. The conditions for age hardening may be known conditions set for alloys. It goes without saying that substantially the same age hardening conditions are applied to the bumper beam 1 throughout its length in the longitudinal direction.

The age hardening hardens and strengthens the whole bumper beam 1 except a region (low-hardness region) in the heat-affected zones A3 and B3. When the holding temperature of the reversion treatment of 7000 series aluminum alloys is approximately 400° C. or more, the heated portions A2 and B2 become a redissolved state, and age hardening hardens and strengthens the non-heat-affected zones A4 and B4. The term "reversion treatment", as used herein, includes the redissolution. Redissolution also occurs at approximately 400° C. or more in other alloys (for example, 6000 series).

The low-hardness regions A5 and B5 formed in the heat-affected zones A3 and B3 are regions that are subjected to heating corresponding to excess overaging or annealing over the whole cross section of the bumper beam 1 during the reversion treatment. The low-hardness regions A5 and B5 after age hardening have lower hardness and strength than the heated portions A2 and B2 and the non-heat-affected zones A4 and B4. In 7000 series aluminum alloys, the minimum Vickers hardness of the low-hardness regions A5 and B5 can be lower than the Vickers hardness of the non-heat-affected zones A4 and B4 by 20 Hv or more.

The areas of the heat-affected zones A3 and B3 and the low-hardness regions increase with increasing holding temperature of the reversion treatment and decreasing cooling rate after the reversion treatment (the areas are greater in the case of air cooling than water cooling). The position at which the low-hardness regions A5 and B5 have the minimum Vickers hardness becomes more distant from the heated portions A2 and B2 as the holding temperature of the reversion treatment increases.

A bumper structure illustrated in FIG. 2 is composed of a bumper beam 6 and bumper stays 5 joined to end portions 3 of the bumper beam 6. The bumper beam 6 is formed by locally subjecting the end portions 3 of the bumper beam 1 (see FIG. 1A) to reversion treatment and crushing and subjecting the bumper beam 1 to age hardening throughout its length. The bumper stays 5 are formed by cutting an aluminum alloy extrusion perpendicularly to the extrusion direction into aluminum alloy extrusions each having a predetermined length. The aluminum alloy extrusion has left and right webs and front and rear flanges. The bumper stays 5 are disposed behind the bumper beam 6 such that the extrusion direction is perpendicularly to the bumper beam 6. The front flange is joined to the back wall of the bumper beam 6, for example, with bolts.

In the bumper beam 6, portions A1 are crushed backward, and heat-affected zones A3 are formed in joint sections S of the bumper stays 5. In the heat-affected zones A3, low-hardness regions A5 (regions indicated by dots) that overlap the joint sections S are formed over the entire cross section of the bumper beam 6.

A bumper structure illustrated in FIG. 3 is composed of a bumper beam 7 and bumper stays 5 joined to end portions 3 of the bumper beam 7. The bumper beam 7 is formed by subjecting the central portion 2, the bent portions 4, and a portion of the end portions 3 (to the vicinity of the joint sections S of the bumper stays 5) of the bumper beam 1 (see FIG. 1B) to reversion treatment, then crushing the central portion 2, and subjecting the bumper beam 1 to age hardening throughout its length.

In the bumper beam 7, a portion B1 is crushed backward, and a heat-affected zone B3 is formed in a joint section S of a bumper stay 5. In the heat-affected zone B3, a low-hardness region B5 that overlaps the joint section S is formed.

In the bumper structures illustrated in FIGS. 2 and 3, the low-hardness regions A5 and B5 that overlap the joint sections S are formed in the bumper beams 6 and 7. The low-hardness regions A5 and B5 have lower hardness and strength than the other regions and can be easily deformed in a collision. The heated portions A2 and B2 and the non-heat-affected zones A4 and B4 as well as the heat-affected zones A3 and B3 except the low-hardness regions A5 and B5 have high strength because of age hardening.

As a result, as described below in the examples, these bumper structures have improved collision energy absorption characteristics.

The low-hardness regions A5 and B5 overlap the joint sections S in the longitudinal direction of the bumper beams 6 and 7. As illustrated in FIG. 3, the low-hardness regions A5 and B5 may extend to the left and right of the joint sections S. However, the low-hardness regions A5 and B5 in the bent portions 4 may result in cracking in the bent portions 4 in a collision. Thus, preferably, the low-hardness regions A5 and B5 are not formed in the bent portions 4.

EXAMPLES

A 7000 series aluminum alloy composed of Zn: 6.39 mass %, Mg: 1.34 mass %, Cu: 0.15 mass %, Fe: 0.11 mass %, Si: 0.04 mass %, Mn: 0.02 mass %, Cr: 0.03 mass %, Zr: 0.13 mass %, and Ti: 0.02 mass %, the remainder being aluminum and incidental impurities, was subjected to hot extrusion and was fan-cooled on a production line immediately after the extrusion (press quenching), thereby forming a hollow extrusion having a 60 mm×120 mm rectangular cross section. The hollow extrusion was cut into hollow extrusions each having a length of 1300 mm for 25 bumper beams.

Figure 4:
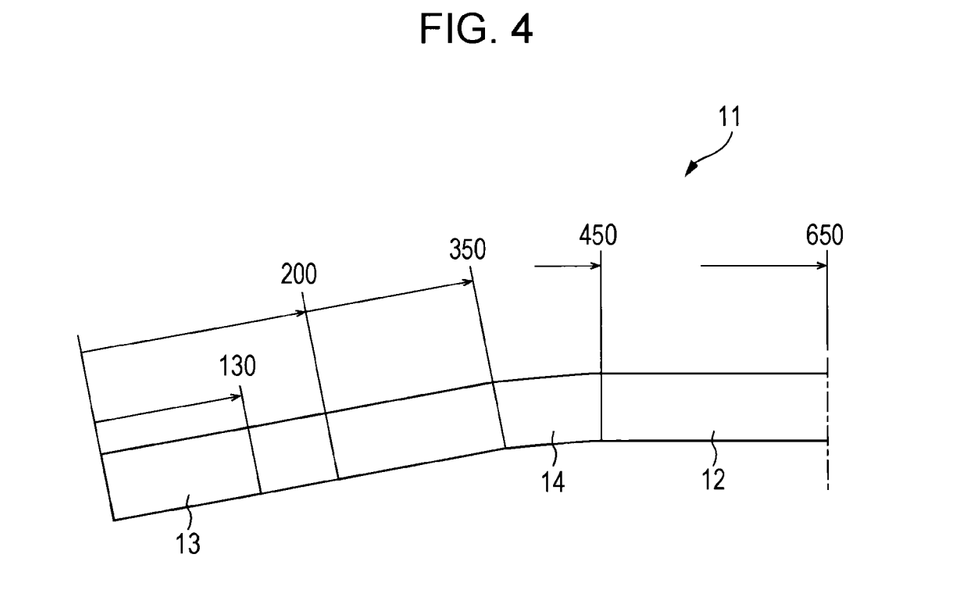
FIG. 4 is a plan view of a bumper beam (after bending) according to an example in which the size of each portion is shown.

Each of the hollow extrusions for bumper beams was subjected to natural aging at room temperature for 20 days (T1-tempered members) and was bent to form a bumper beam 11, as illustrated in FIG. 4. Twenty-five bumper reinforcing beams 11 were formed. The bumper beam 11 was bilaterally symmetric and included a central portion 12, an end portion 13, and a bent portion 14. With reference to left and right ends (zero points), the end portion 13 extended from 0 to 350 mm, the bent portion 14 extended from 350 to 450 mm, and the central portion 12 extended from 450 to 650 mm. The bumper beam 11 had a thickness of 60 mm in the direction of travel. The end portion 13 had an inclination angle of 10 degrees relative to the central portion 12. The bent portion 14 had a bend radius of 500 mm. A bumper stay 15 (see FIG. 7) was joined to the back wall of an end portion 13 of the bumper beam 11. The joint section S extended from 130 to 200 mm.

The bumper beam 11 was heated for reversion treatment under the conditions shown in Table 1. Heating for the reversion treatment was high-frequency induction heating. The bumper reinforcing member 11 was held at a holding temperature for 60 seconds and was immediately water-cooled (cooling rate: 170° C./s) or air-cooled (cooling rate: 5° C./s). A portion to be heated for reversion treatment was bilaterally symmetric and extended from 0 to 125 mm in No. 1 and 225 to 650 mm in No. 19 with reference to left and right ends (zero points). The heated portions in Nos. 1 and 19 are indicated by dots in FIGS. 5A and 6A.

Figure 5A:
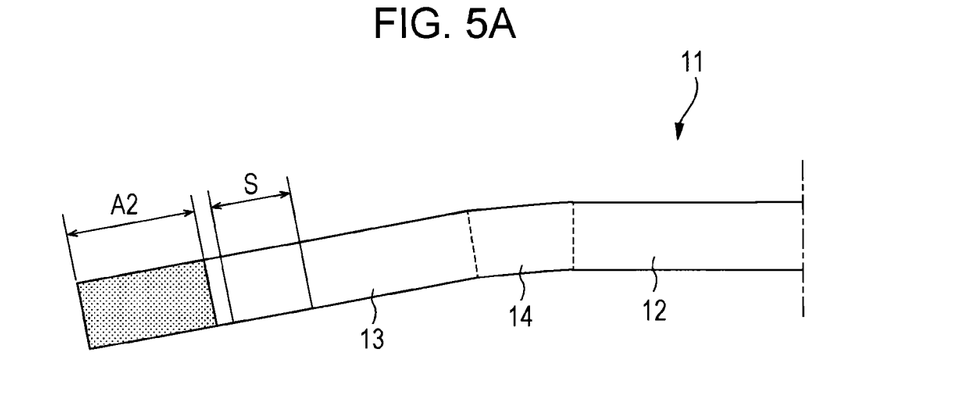
FIG. 5A is a plan view of a portion heated for reversion treatment in the case where an end portion of the bumper beam illustrated in FIG. 4 is to be crushed.
Figure 5B:
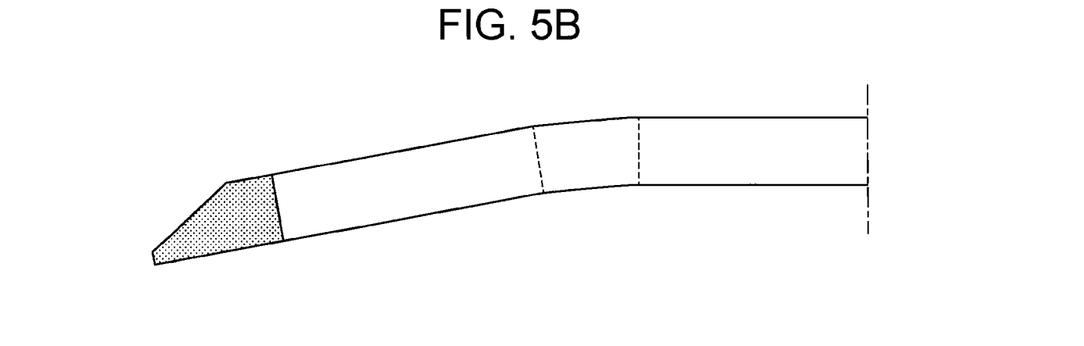
FIG. 5B is a plan view of the bumper beam after crushing.
Figure 6A:
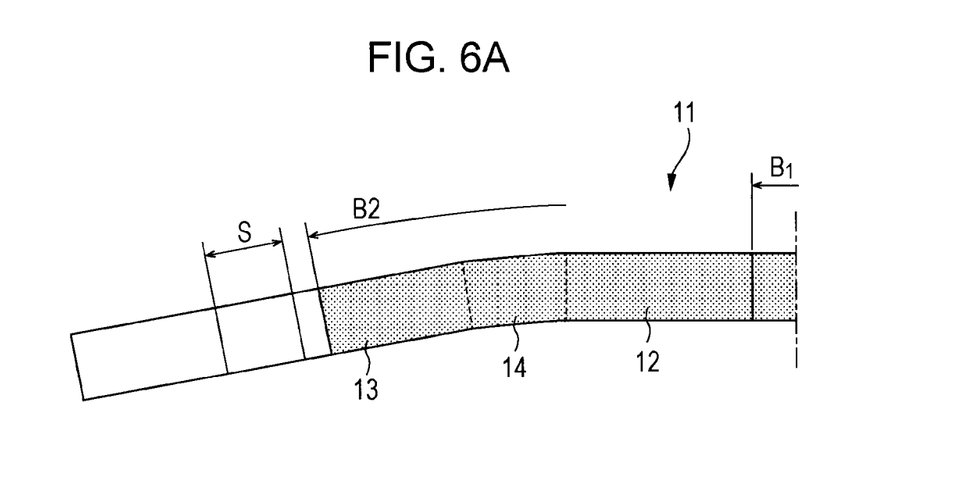
FIG. 6A is a plan view of a portion heated for reversion treatment in the case where a central portion of the bumper beam illustrated in FIG. 4 is to be crushed.
Figure 6B:
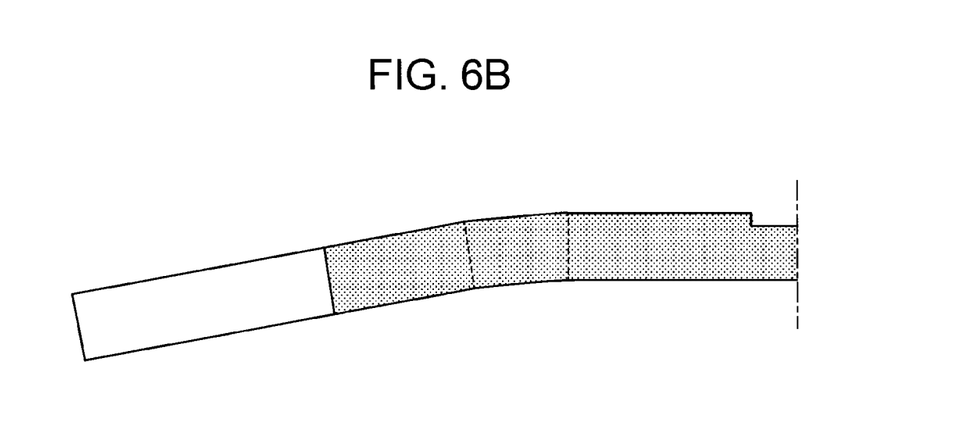
FIG. 6B is a plan view of the bumper beam after crushing.

After the reversion treatment, as shown in Table 1, 0 to 80 mm of both end portions were crushed in the direction of travel in Nos. 1 to 18, and 610 to 650 mm of a central portion was crushed in the direction of travel in Nos. 19 to 25. Nos. 1 and 19 after crushing are illustrated in FIGS. 5B and 6B.

TABLE 1

| | Portion heated for reversion treatment | | | | Crushed portion | |
|---|---|---|---|---|---|---|
| No. | Holding temperature ° C. | Cooling rate ° C./sec | Outer end mm | Inner end mm | Hardness H1 Hv | Outer end mm | Inner end mm |
| 1 | 298 | 170 | 0 | 125 | 144 | 0 | 80 |
| 2 | 362 | 170 | 0 | 125 | 144 | 0 | 80 |
| 3 | 415 | 170 | 0 | 125 | 163 | 0 | 80 |
| 4 | 460 | 170 | 0 | 125 | 171 | 0 | 80 |
| 5 | 485 | 170 | 0 | 125 | 172 | 0 | 80 |
| 6 | 538 | 170 | 0 | 125 | 176 | 0 | 80 |
| 7 | 298 | 170 | 0 | 165 | 144 | 0 | 80 |
| 8 | 362 | 170 | 0 | 165 | 144 | 0 | 80 |
| 9 | 415 | 170 | 0 | 165 | 163 | 0 | 80 |
| 10 | 460 | 170 | 0 | 165 | 171 | 0 | 80 |
| 11 | 485 | 170 | 0 | 165 | 173 | 0 | 80 |
| 12 | 538 | 170 | 0 | 165 | 177 | 0 | 80 |
| 13 | 298 | 170 | 0 | 335 | 144 | 0 | 80 |
| 14 | 362 | 170 | 0 | 335 | 144 | 0 | 80 |
| 15 | 415 | 170 | 0 | 335 | 163 | 0 | 80 |
| 16 | 460 | 170 | 0 | 335 | 171 | 0 | 80 |
| 17 | 485 | 170 | 0 | 380 | 172 | 0 | 80 |
| 18 | 538 | 170 | 0 | 420 | 176 | 0 | 80 |
| 19 | 298 | 5 | 225 | 650 | 144 | 610 | 650 |
| 20 | 362 | 5 | 225 | 650 | 144 | 610 | 650 |
| 21 | 415 | 5 | 225 | 650 | 160 | 610 | 650 |
| 22 | 460 | 5 | 225 | 650 | 169 | 610 | 650 |
| 23 | 485 | 5 | 225 | 650 | 169 | 610 | 650 |
| 24 | 538 | 5 | 225 | 650 | 171 | 610 | 650 |
| 25 | 538 | 5 | 125 | 650 | 171 | 610 | 650 |

The whole bumper beam was then subjected to age hardening at 130° C. for 8 hours. The Vickers hardness and the energy absorption characteristics for simulating motor vehicle crashes were measured as described below.

Measurement of Vickers Hardness

The Vickers hardness of a vertical central portion on the front wall of the bumper beam was measured from an end to a horizontal central portion at intervals of 10 mm. In Nos. 2 to 6, 8 to 12, 14 to 18, and 20 to 25, a low Vickers hardness region (low-hardness region) was formed in the vicinity of the portions A2 and B2 heated for reversion treatment (heat-affected zones). The Vickers hardness (hardness H1) of a portion heated for reversion treatment, the minimum Vickers hardness (minimum hardness H2) of a heat-affected zone (low-hardness region), and the Vickers hardness (hardness H3) of a non-heat-affected zone were determined from the measurements and were shown in Tables 1 and 2. The measuring point of the minimum hardness H2 (the distance from an end of the bumper beam) and the hardness difference (H1–H2 and H3–H2) were also shown in Table 2. The Vickers hardness H1 of a portion heated for reversion treatment was the average Vickers hardness of the heated portion except crushed portions. The Vickers hardness H3 of a non-heat-affected zone was the average Vickers hardness of a region in which the Vickers hardness was not decreased except portions heated for reversion treatment and the vicinities of the portions.

Measurement of Energy Absorption Characteristics

Figure 7:
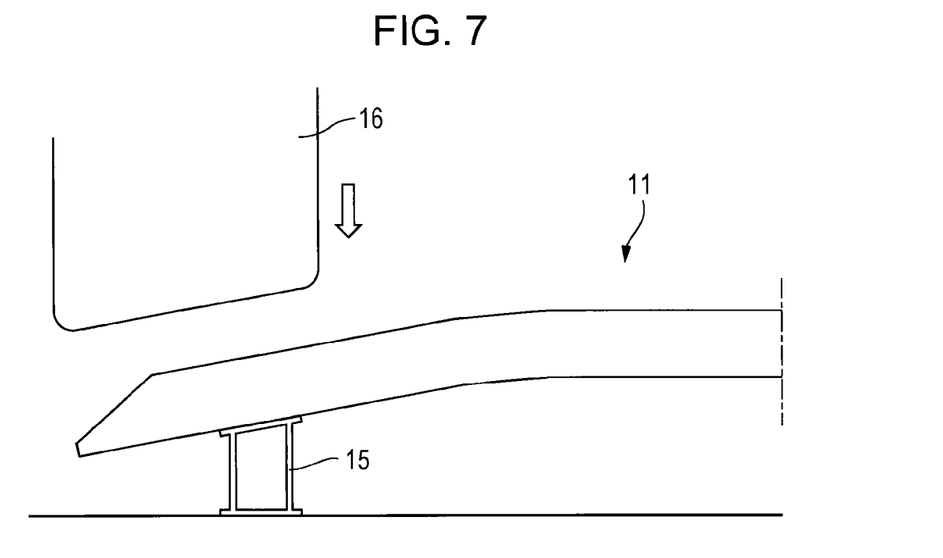
FIG. 7 is a plan view illustrating an offset barrier impact test according to an example.

As illustrated in FIG. 7, a bumper stay 15 was joined to (left and right) joint sections S of the bumper beam 11, and the bumper beam 11 was subjected to an offset barrier impact test that simulated a low-speed collision. A front flange of the bumper stay 15 had a width of 70 mm and was joined to the back wall of the bumper beam 11 with bolts. The front surface of a barrier 16 was tilted at an angle of 10 degrees and was parallel to the front wall of the end portion 13 of the bumper beam 11. The stroke of the barrier 16 was 40 mm after the barrier 16 collided with the front wall of the end portion 13 of the bumper beam 11. The peak load and EA efficiency were determined from the results of the offset barrier impact test. The presence or absence of collision cracking was visually inspected. Table 2 shows the results.

Figure 8:
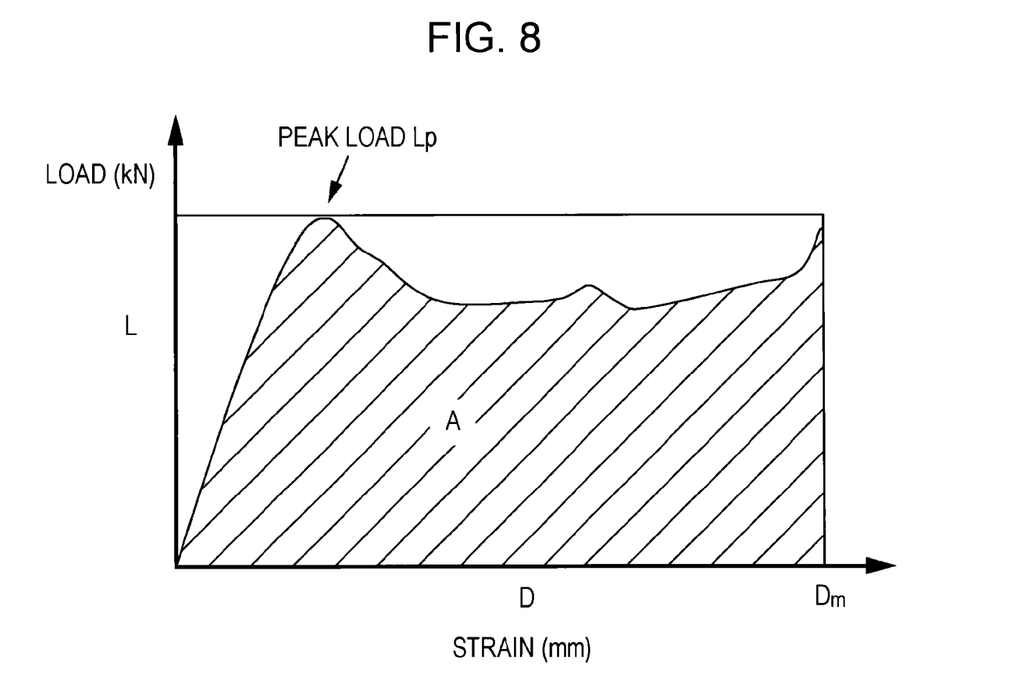
FIG. 8 is an explanatory view of EA efficiency in an example.

In a graph of load L and strain d obtained from the offset barrier impact test (see FIG. 8), the EA efficiency was represented by A/(Lp×Dm), wherein Lp denotes the peak load, Dm denotes the maximum strain (=40 mm), and A denotes the energy absorption of the bumper beam 11 (the area of the hatched region in FIG. 8).

TABLE 2

| | Heat-affected zone (low-hardness region) | | | | Non-heat-affected zone Hardness H3 Hv | Evaluation | | | |
|---|---|---|---|---|---|---|---|---|---|
| No. | Minimum hardness H2 Hv | Measuring point of minimum hardness mm | Hardness difference H1 – H2 Hv | Hardness difference H3 – H2 Hv | | Peak load kN | EA efficiency % | Presence or absence of collision cracking | Overall |
| 1 | 144 | — | 0 | 0 | 144 | 130 | 68 | ○ | x |
| 2 | 120 | 130 | 24 | 24 | 144 | 119 | 74 | ○ | ○ |
| 3 | 117 | 130 | 46 | 27 | 144 | 116 | 76 | ○ | ○ |
| 4 | 120 | 140 | 51 | 24 | 144 | 114 | 78 | ○ | ○ |
| 5 | 121 | 140 | 51 | 23 | 144 | 115 | 77 | ○ | ○ |
| 6 | 124 | 150 | 52 | 20 | 144 | 114 | 78 | ○ | ○ |
| 7 | 144 | — | 0 | 0 | 144 | 130 | 68 | ○ | x |
| 8 | 120 | 170 | 20 | 24 | 144 | 118 | 75 | ○ | ○ |
| 9 | 116 | 170 | 24 | 28 | 144 | 115 | 77 | ○ | ○ |
| 10 | 122 | 180 | 49 | 22 | 144 | 115 | 77 | ○ | ○ |
| 11 | 122 | 180 | 51 | 22 | 144 | 114 | 78 | ○ | ○ |
| 12 | 123 | 190 | 54 | 21 | 144 | 114 | 79 | ○ | ○ |
| 13 | 144 | — | 0 | 0 | 144 | 130 | 68 | ○ | x |
| 14 | 121 | 340 | 23 | 23 | 144 | 130 | 68 | ○ | x |
| 15 | 118 | 340 | 45 | 26 | 144 | 132 | 67 | ○ | x |

TABLE 2-continued

| | Heat-affected zone (low-hardness region) | | | | Non-heat-affected zone Hardness H3 Hv | Peak load kN | EA efficiency % | Evaluation | |
|---|---|---|---|---|---|---|---|---|---|
| No. | Minimum hardness H2 Hv | Measuring point of minimum hardness mm | Hardness difference H1 − H2 Hv | Hardness difference H3 − H2 Hv | | | | Presence or absence of collision cracking | Overall |
| 16 | 120 | 350 | 51 | 24 | 144 | 134 | 66 | ○ | x |
| 17 | 116 | 400 | 56 | 28 | 144 | 135 | 65 | cracking | x |
| 18 | 120 | 440 | 56 | 24 | 144 | 134 | 67 | cracking | x |
| 19 | 144 | — | 0 | 0 | 144 | 133 | 66 | ○ | x |
| 20 | 120 | 220 | 24 | 24 | 144 | 119 | 74 | ○ | ○ |
| 21 | 116 | 210 | 44 | 28 | 144 | 117 | 75 | ○ | ○ |
| 22 | 119 | 200 | 50 | 25 | 144 | 116 | 76 | ○ | ○ |
| 23 | 121 | 190 | 48 | 23 | 144 | 116 | 76 | ○ | ○ |
| 24 | 122 | 180 | 49 | 22 | 144 | 115 | 77 | ○ | ○ |
| 25 | 120 | 80 | 51 | 24 | 144 | 131 | 67 | ○ | x |

Table 2 shows that Nos. 1 and 7 of Nos. 1 to 12 had no effect of the reversion treatment because of a low holding temperature for the reversion treatment and had no low-hardness region. Thus, Nos. 1 and 7 had high peak loads, EA efficiencies of less than 70%, and poor energy absorption characteristics in the impact test. In Nos. 2 to 6 and 8 to 12, a low-hardness region was formed in the bumper stay joint section, and the hardness difference H3-H2 was 20 Hv or more. As a result, the peak load was lower than Nos. 1 and 7 by 10 kN or more, and the EA efficiency was 70% or more.

No. 13 of Nos. 13 to 18 had no effect of the reversion treatment because of a low holding temperature for the reversion treatment and had no low-hardness region. Thus, No. 13 had a high peak load, an EA efficiency of less than 70%, and poor energy absorption characteristics in the impact test. In Nos. 14 to 18, no low-hardness region was formed in the bumper stay joint section. This resulted in high peak loads, EA efficiencies of less than 70%, and poor energy absorption characteristics in the impact test. In particular, in Nos. 17 and 18, because of the formation of a low-hardness region in a bent portion, cracking occurred in the bent portion in the impact test.

No. 19 of Nos. 19 to 25 had no effect of the reversion treatment because of a low holding temperature for the reversion treatment and had no low-hardness region. Thus, No. 19 had a high peak load, an EA efficiency of less than 70%, and poor energy absorption characteristics in the impact test. In No. 25, no low-hardness region was formed in the bumper stay joint section. This resulted in a high peak load, an EA efficiency of less than 70%, and poor energy absorption characteristics in the impact test. In Nos. 20 to 24, a low-hardness region was formed in the bumper stay joint section, and the hardness difference H3-H2 was 20 Hv or more. As a result, the peak load was lower than No. 19 by 10 kN or more, and the EA efficiency was 70% or more.

What is claimed is:

1. A bumper structure, comprising:
  a bumper beam formed of a heat-treatable aluminum alloy extrusion, comprising
    a pair of heat affected zones and a pair of low hardness regions;
  a pair of bumper stays; and
  a pair of joint sections configured to join the bumper stays in both end portions of the bumper beam;
    the bumper beam comprising a pair of portions in both ends subjected to;
      a plastic working, and
      a reversion treatment before the plastic working, thereby forming the heat-affected zones and the low-hardness regions that overlap each other in the joint sections; and
    the whole bumper beam subjected to an age hardening after the plastic working.

2. The bumper structure according to claim 1, wherein the bumper beam includes;
  a central portion parallel to an automobile width direction,
  end portions that are tilted toward an automobile body, and
  bent portions coupled to the central portion and the end portions, and the joint sections and the low-hardness regions are disposed in the end portions.

3. The bumper structure according to claim 1, wherein a minimum hardness position in the low-hardness region is disposed in the joint sections.

4. The bumper structure according to claim 2, wherein a minimum hardness position in the low-hardness region is disposed in the joint sections.

5. The bumper structure according to claim 1, wherein the heat-treatable aluminum alloy extrusion is formed of a JIS 7000 series aluminum alloy.

6. The bumper structure according to claim 2, wherein the heat-treatable aluminum alloy extrusion is formed of a JIS 7000 series aluminum alloy.

7. The bumper structure according to claim 3, wherein the heat-treatable aluminum alloy extrusion is formed of a JIS 7000 series aluminum alloy.

8. The bumper structure according to claim 4, wherein the heat-treatable aluminum alloy extrusion is formed of a JIS 7000 series aluminum alloy.

9. The bumper structure according to claim 5, wherein a difference between the minimum Vickers hardness of the low-hardness region and the Vickers hardness of a non-heat-affected zone in the reversion treatment is higher than or equal to 20 Hv.

10. The bumper structure according to claim 6, wherein a difference between the minimum Vickers hardness of the low-hardness region and the Vickers hardness of a non-heat-affected zone in the reversion treatment is higher than or equal to 20 Hv.

11. The bumper structure according to claim 7, wherein a difference between the minimum Vickers hardness of the low-hardness region and the Vickers hardness of a non-heat-affected zone in the reversion treatment is higher than or equal to 20 Hv.

12. The bumper structure according to claim 8, wherein a difference between the minimum Vickers hardness of the low-hardness region and the Vickers hardness of a non-heat-affected zone in the reversion treatment is higher than or equal to 20 Hv.

* * * * *